Patented July 14, 1931

1,814,145

UNITED STATES PATENT OFFICE

PHILIP H. GROGGINS, OF WASHINGTON, DISTRICT OF COLUMBIA; DEDICATED, BY ASSIGNMENT, TO THE GOVERNMENT AND THE PEOPLE OF THE UNITED STATES OF AMERICA

PROCESS OF PREPARING PARA-PHENYL-ORTHO-BENZOYL-BENZOIC ACID

No Drawing.   Application filed August 8, 1929.   Serial No. 384,505.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by and for the Government for governmental purposes without payment to me of any royalty thereon.

My invention relates to an improved method of preparing para-phenyl-ortho-benzoyl-benzoic acid, and more particularly the aluminum base of this compound. The free acid has previously been prepared from diphenyl and phthalic anhydride by means of the Friedel-Crafts synthesis but the procedure described did not permit of commercial exploitation.

The reactions relating to the formation of para-phenyl-ortho-benzoyl-benzoic acid may be expressed graphically as follows:

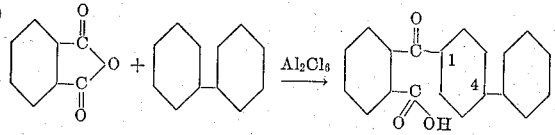

The formula for the intermediate aluminum compound being probably

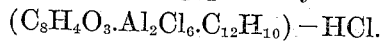

The aluminum base or the keto acid which is obtained by hydrolysis can be readily converted to phenyl anthraquinone, a valuable intermediate for vat dyes.

Elbs (J. Prack. Chemie 41, 145, 1890) using ligroin as a solvent at 90–100° C. obtained a 30–40 per cent yield of a very impure resinous product. Kaiser (Ann. 257, 95, 1890) used a 100 per cent excess of diphenyl at a temperature of 100° C. and obtained a low yield of brown material. Scholl and Novius (Ber. 44, 1075, 1911) obtained a product of satisfactory purity by using an excess of 150 per cent phthalic anhydride, along with a large quantity of carbon disulfide as solvent for the solid reacting materials.

In my process I use theoretically combining proportions of phthalic anhydride and diphenyl, preferably without the use of any solvent. It is understood, however, that the incorporation of a limited quantity of inert solvent is not excluded from the claims of my improved process. I prefer also to operate at considerably lower temperatures than previously used; 85° C. being the maximum. I have found that the combination of reduced temperature, molecular proportions of the reacting materials, and efficient agitation of the reaction mass are responsible for great improvements in manufacture and a much lower cost of production. The yields and purity of the para-phenyl-ortho-benzoyl-benzoic acid subsequently obtained by my process are also better, this being brought about by the suppression of phthalide formation, which occurs when the condensation is conducted at higher temperatures.

Without limiting myself to any particular detailed procedure, the following example in which parts by weight are given, illustrates the application of my invention in the preferred form:

The following finely divided materials are placed into a mixing machine at room temperature:

148 parts phthalic anhydride = 1 mol.
154 parts diphenyl = 1 mol. 267–293 parts aluminum chloride = 1 mol. to 10% excess.
The contents are mixed for one or more hours after which heat is slowly applied. The batch resolves into a brown gummy mass when the temperature reaches 35–45° C. and a vigorous evolution of hydrogen chloride takes place. The charge is maintained at 60–65° C. for twelve hours or until the evolution of hydrogen chloride ceases under conditions insuring an efficient mixing of the ingredients. It is then cooled with continued agitation and the anhydrous aluminum base of para-phenyl-ortho-benzoyl-benzoic acid is obtained as a dusty green powder. When the free acid is desired the aluminum base may be hydrolyzed according to the usual known methods. By my process a yield of 95 to 96 per cent of theory, para-phenyl-ortho-benzoyl-benzoic acid is obtained as colorless material, M. P. 224–227° C. When purified the melting point is 231.5° C.

Although no claims are made for the design or construction of the reaction vessel it has been found that several commercial mixing machines are suitable for this purpose. These insure (1) positive mixing, (2) means of removing hydrogen chloride, (3) jacket construction for heating, and (4) easy dumping devices.

I am aware that numerous details of the process may be varied without departing from the spirit of this invention and I do not desire limiting the patent granted thereon otherwise than necessitated by the prior art.

I claim as my invention—

1. A process of preparing the aluminum base of para-phenyl-ortho-benzoyl-benzoic acid which comprises condensing phthalic anhydride and diphenyl in the presence of anhydrous aluminum chloride at a temperature not exceeding 85° C.

2. A process of preparing the aluminum base of para-phenyl-ortho-benzoyl-benzoic acid which comprises condensing phthalic anhydride and diphenyl in practically the theoretical combining proportions with anhydrous aluminum chloride at a temperature not exceeding 85° C.

3. A process of preparing the aluminum base of para-phenyl-ortho-benzoyl-benzoic acid which comprises condensing molecular proportions of phthalic anhydride and diphenyl in the presence of anhydrous aluminum chloride at a temperature not exceeding 85° C. and using less solvent than corresponds to the weight of phthalic anhydride taken.

4. A process of preparing the aluminum base of para-phenyl-ortho-benzoyl-benzoic acid which comprises condensing approximately molecular proportions of phthalic anhydride and diphenyl in the presence of anhydrous aluminum chloride without the use of solvents.

5. As a new article of manufacture the condensation product of phthalic anhydride, diphenyl, and anhydrous aluminum chloride in the form of dry green powder, which corresponds probably to the formula,

$$(C_8H_4O_3 \cdot Al_2Cl_6 \cdot C_{12}H_{10}) - HCl$$

and is obtainable by mixing the components in approximately molecular proportions at a temperature of 30 to 85° C.

6. A process of preparing para-phenyl-ortho-benzoyl-benzoic acid which comprises preparing the anhydrous alumnium base according to claim 3, and then hydrolyzing the intermediate aluminum compound by bringing it into contact with water.

In testimony whereof, I have hereunto subscribed my name.

PHILIP H. GROGGINS.